United States Patent [19]

Cowan et al.

[11] Patent Number: 5,558,688

[45] Date of Patent: Sep. 24, 1996

[54] BLOCK FILTER-PURIFIER

[75] Inventors: Cathy L. Cowan, San Jose; Stephen Y. Lau, San Leandro, both of Calif.

[73] Assignee: Semi-Gas Systems, Inc., San Jose, Calif.

[21] Appl. No.: 591,214

[22] Filed: Jan. 17, 1996

Related U.S. Application Data

[63] Continuation of Ser. No. 275,036, Jul. 14, 1994, abandoned.

[51] Int. Cl.⁶ .......................... B01D 46/00; B01D 35/02
[52] U.S. Cl. .................. 55/312; 55/417; 55/418; 55/503; 55/505; 55/512; 95/274
[58] Field of Search .................. 96/147, 151, 153, 96/108; 55/417, 418, 312, 512, 503, 504, 505, 328; 95/273, 274

[56] References Cited

U.S. PATENT DOCUMENTS

| | | | |
|---|---|---|---|
| 1,999,460 | 4/1935 | Johnson | 96/151 |
| 2,313,773 | 3/1943 | Samiran | 55/417 |
| 2,758,719 | 8/1956 | Line | 96/147 |
| 2,880,753 | 4/1959 | Wilkins | 55/417 |
| 2,920,716 | 1/1960 | Shada | 55/417 |
| 3,241,537 | 3/1966 | Jones | 55/417 |
| 3,961,919 | 6/1976 | Lamoreaux | 96/138 |
| 4,278,453 | 6/1981 | Klein | 96/151 |
| 4,483,461 | 11/1984 | Igarashi | 55/417 |
| 4,689,057 | 8/1987 | Gasper | 96/147 |
| 4,696,687 | 9/1987 | Billiet et al. | 55/312 |
| 4,971,110 | 11/1990 | Cato et al. | 137/614.04 |
| 5,139,747 | 8/1992 | Cato et al. | 422/122 |

*Primary Examiner*—Jay H. Woo
*Assistant Examiner*—Duane S. Smith
*Attorney, Agent, or Firm*—Law Offices of Thomas E. Schatzel

[57] ABSTRACT

A filter-purifier that removes particles as well as trace amounts of moisture, oxygen, and other chemical impurities from a gas stream. The filter-purifier includes a removable canister that contains a purifying medium and a pair of sealing poppet valves that automatically close when the canister is removed from an in-line block body. The block body includes gas line fittings with close gland-to-gland separations, since the canister is off to one side and not positioned directly in line between the glands.

9 Claims, 4 Drawing Sheets

BLOCK FILTER-PURIFIER

This application is a continuation of application Ser. No. 08/275,036 filed on Jul. 14, 1994 now abandoned.

BACKGROUND OF THE INVENTION

1. Field of the Invention

The invention relates generally to gas filters and purifiers and more specifically to devices that remove both particles and chemical impurities from gases used to fabricate integrated circuits in the semiconductor industry.

2. Description of the Prior Art

Semiconductor processing requires the use of a wide variety of gases in the fabrication process. The conductivity of semiconductor materials is controlled by the careful introduction of certain impurities, such as phosphorus and boron. Unwanted impurities, or even the right ones in the wrong amounts, can spoil all the semiconductor wafers subject to the contamination. Semiconductor manufacturers go to great lengths to buy pure silicon ingots, design and operate class 100, class 10, and class 1 cleanrooms, and even require personnel to wear lint-free "bunny suits" to reduce the risk of contamination.

Gas producers take great care to supply contamination-free gases, but contaminants inevitably creep in. The semiconductor industry therefore customarily uses filters and purifiers at the point-of-use near where the gas is actually used in the process. As such, space is at a premium. Available space is also shrinking with successive generations of equipment as the tools that use them are getting smaller and smaller. Periodic replacement of both filters and purifiers is needed, and this requires that connectors and valves be included and the filters and purifiers located so as to accommodate service. Both the valves and the location needs consume more valuable space.

Several manufacturers worldwide produce a range of purifiers that use various purifying agents internal to the devices. SAES Pure Gas (San Luis Obispo, Calif.) produces a purifier that uses a gettering alloy that must be heated during operation. Japan Pionics, Nippon Sanso, Advanced Technology Materials, Inc. (New Milford, Conn.), and Ergenics (Wyckoff, N.J.) also make commercially available purifiers. Matheson Electronics Product Group, Semi-Gas Division (San Jose, Calif.), produces a line of purifiers that are filled with a highly reactive resin that is commercially marketed as NANOCHEM® on license from Hercules Corporation. The NANOCHEM resin does not require heating during use and is much less expensive to operate than the types that do require heating. The NANOCHEM, however, must be protected from exposure to air and it is crucial that none of the resin material come close enough to the process of welding a purifier closed to cause the NANOCHEM to melt, because the melting can release enough contaminants to saturate the remaining resin in the purifier.

As integrated circuit semiconductor device geometries decrease, the purification of gases used in fabrication needs to be closer to the point of use. The number of conventional filter-purifiers is limited in such applications. Some otherwise acceptable filter-purifiers are only available in a gland-to-gland dimension of 3.31 inches and have unacceptably low flow rates. Many prior art devices are, at times, difficult to install, because they have an outer radius of 0.75 inches, which is more than the port-center-to-back dimension of the majority of mass flow controllers (MFCs) that they are used with. Standoff brackets are often required to raise the MFCs and other manifold components to accommodate such filter-purifiers.

Equipment gas manifolds are increasingly using smaller footprints. A modular block approach to purification is needed for such applications and to allow for the constant trend toward smaller gland-to-gland and vertical height dimensions.

SUMMARY OF THE PRESENT INVENTION

It is therefore an object of the present invention to provide a system to filter and purify purifiable process gases with purification media, such as Nanochem®.

It is another object of the present invention to provide a filter-purifier with the purifier media in canisters that are field replaceable by end users.

It is a still further object of the present invention to provide a filter-purifier with end-point detection.

It is another object of the present invention to provide a filter-purifier with an integrated bypass to allow purge gases to bypass the purifier resins during purges.

Briefly, a preferred embodiment of the present invention is a filter-purifier that removes particles as well as trace amounts of moisture, oxygen, and other chemical impurities from a gas stream. The filter-purifier comprises a removable canister that contains a purifying medium and a pair of sealing poppet valves that automatically close when the canister is removed from an in-line block body. The block body includes gas line fittings with close gland-to-gland separations, since the canister is off to one side and not positioned directly in line between the glands.

An advantage of the present invention is that a filter-purifier is provided that is configured to fit the tight spaces provided in common mass flow controllers and gas distribution manifolds in general.

A further advantage of the present invention is that a filter-purifier is provided that allows its resin canister to be removed from the purifier body without having to break open the gas line.

Another advantage of the present invention is that a filter-purifier is provided that suffers only a minimal amount of contamination from the ambient air during installation.

These and many other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
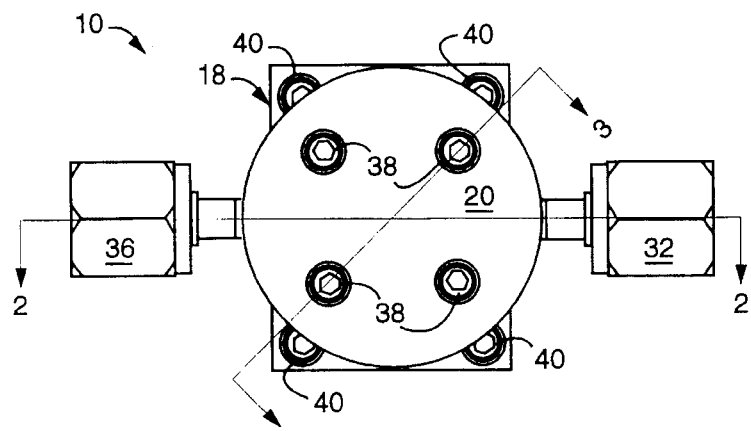
FIG. 1 is end view of a block filter-purifier embodiment of the present invention.
Figure 3:
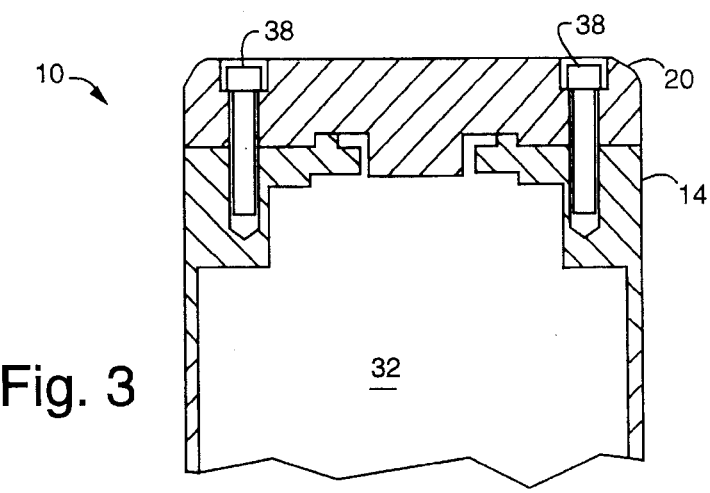
FIG. 3 is a cross-sectional view of the filter-purifier of FIG. 1 taken along the line 3—3.
Figure 2:
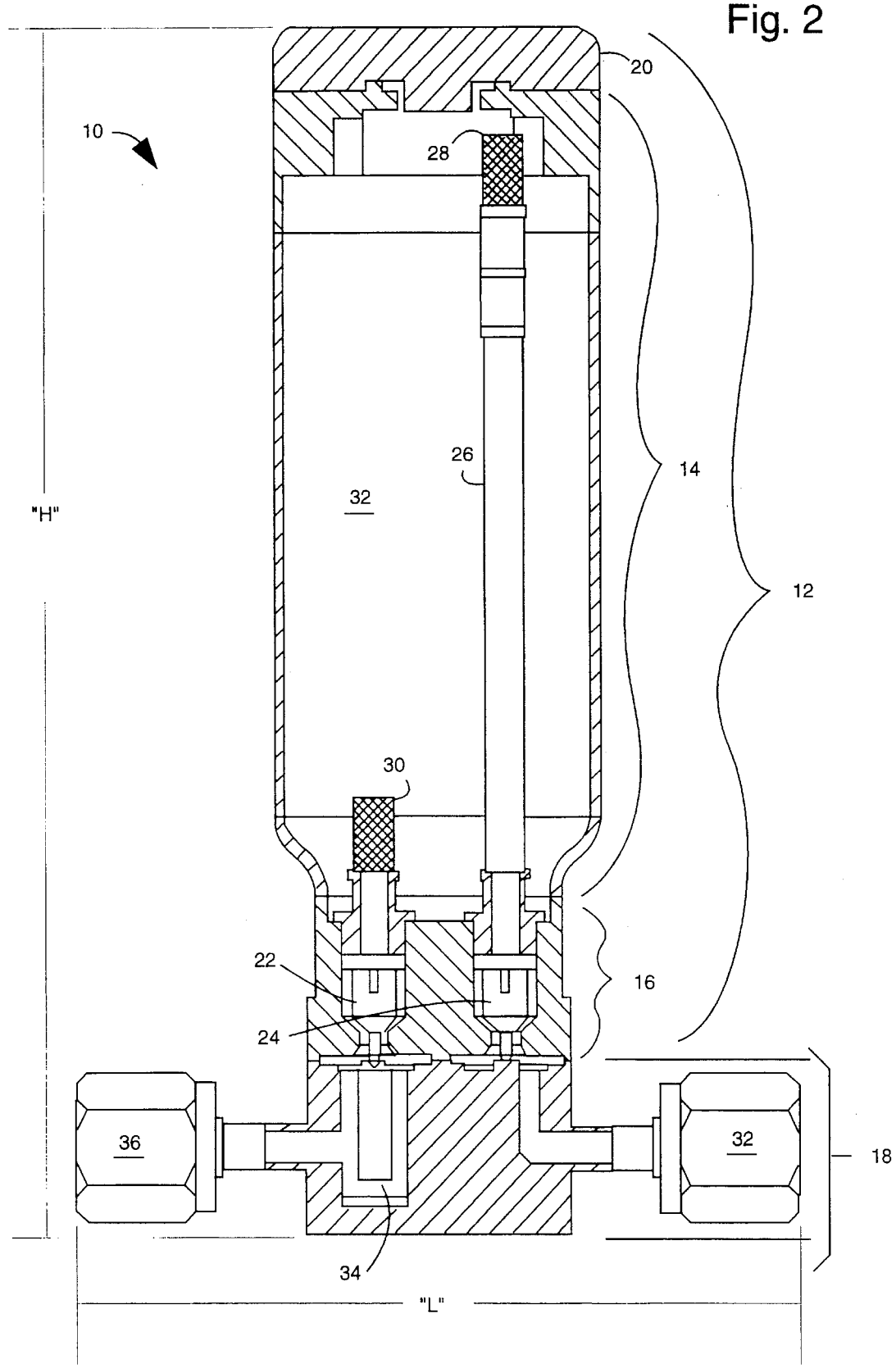
FIG. 2 is a cross-sectional view of the filter-purifier of FIG. 1 taken along the line 2—2.

FIGS. 1–3 illustrate a block filter-purifier embodiment of the present invention, referred to by the general reference numeral 10.

FIG. 2 shows that the block filter-purifier 10 comprises a canister assembly 12 with a typical operating pressure range from vacuum to 125 pounds per square inch, gauge (PSIG). The canister assembly 12 includes a cylinder 14 welded to a canister base 16 for attachment to a block body 18, an end cap 20, an exit valve 22 and an entrance valve 24. A tube 26 conducts entering gas through a screen mesh (frit) 28. Another screen mesh (frit) 30 allows gas to exit after passing through a purification medium 32, e.g., a resin, preferably NANOCHEM® as produced by Hercules, Inc., which forms a resin bed contained between the two screens 28 and 30. (Purifying mediums, such as NANOCHEM®, have the consistency of Styrofoam balls the size of grains of sand.) Typical gases that may be purified by the block filter-purifier 10 include: ammonia, argon, arsine, chlorine, cyclopropane, dichlorosilane, ethane, germane, halocarbon-14, halocarbon-116, halocarbon-C318, helium, hydrogen, hydrogen-bromide, hydrogen-chloride, hydrogen-fluoride, krypton, methane, neon, nitrogen, nitrous-oxide, oxygen, perfluoride-propane, propane, silane, silicon-tetrachloride, sulfur-hexafluoride, trichlorosilane and xenon. Therefore, an all stainless steel construction is preferred.

The valves 22 and 24 are preferably poppet-type valves that automatically close and seal medium 32 from contamination from the outside air whenever the canister assembly 12 is separated from the in-line block 18. Such poppet-valves are described in U.S. Pat. Nos. 4,971,110, and 5,139,747, which are incorporated herein by reference.

Gas flows through the block filter-purifier 10 by entering through a pipe fitting 32, through the valve 24 which is open, up the tube 26 through the screen 28. The medium 32 purifies the gas which exits through the screen 30, passed the valve 22 which is open, passed a high-efficiency metal filter 34, and out a pipe fitting 36. The pipe fittings 32 and 36 are preferably standard quarter-inch machined-on male or welded-on female fittings, e.g., Cajon Company "VCR®" type compatible fittings. Alternatively, tube ends may be welded on for special fittings or all-welded gas manifolds. Preferably, the block filter-purifier 10 has a gland-to-gland dimension "L" of 3.31 inches or five inches and a height dimension "H" not exceeding seven inches. Shorter dimensions "L" may be useful, but purification capacity may be impacted. The width of the block filter-purifier 10, which is perpendicular to the plane of FIG. 2, is preferably less than two inches. Such dimensions allow the block filter-purifier 10 to be used in-line with a commercially-available mass flow controller (MFC).

As shown in FIGS. 1 and 3, the end cap 20 is attached to the cylinder 14 with a set of four screws 38 and the canister assembly attaches to the block body 18 with another set of four screws 40.

Figure 4:
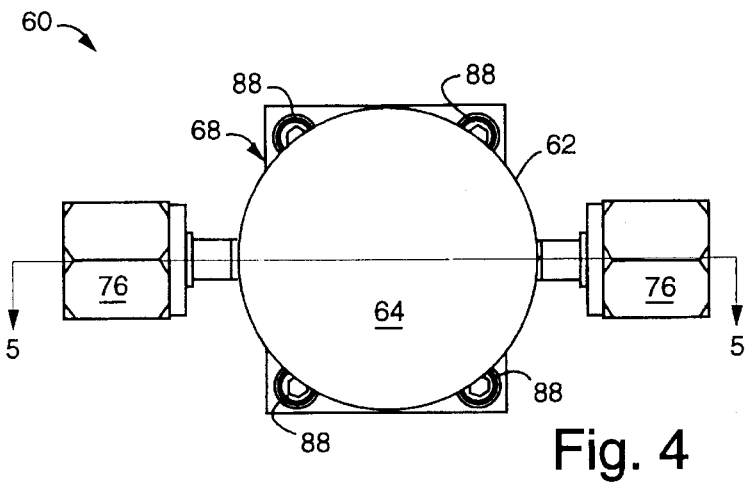
FIG. 4 is an end view of a second embodiment of a filter-purifier of the present invention.
Figure 5:
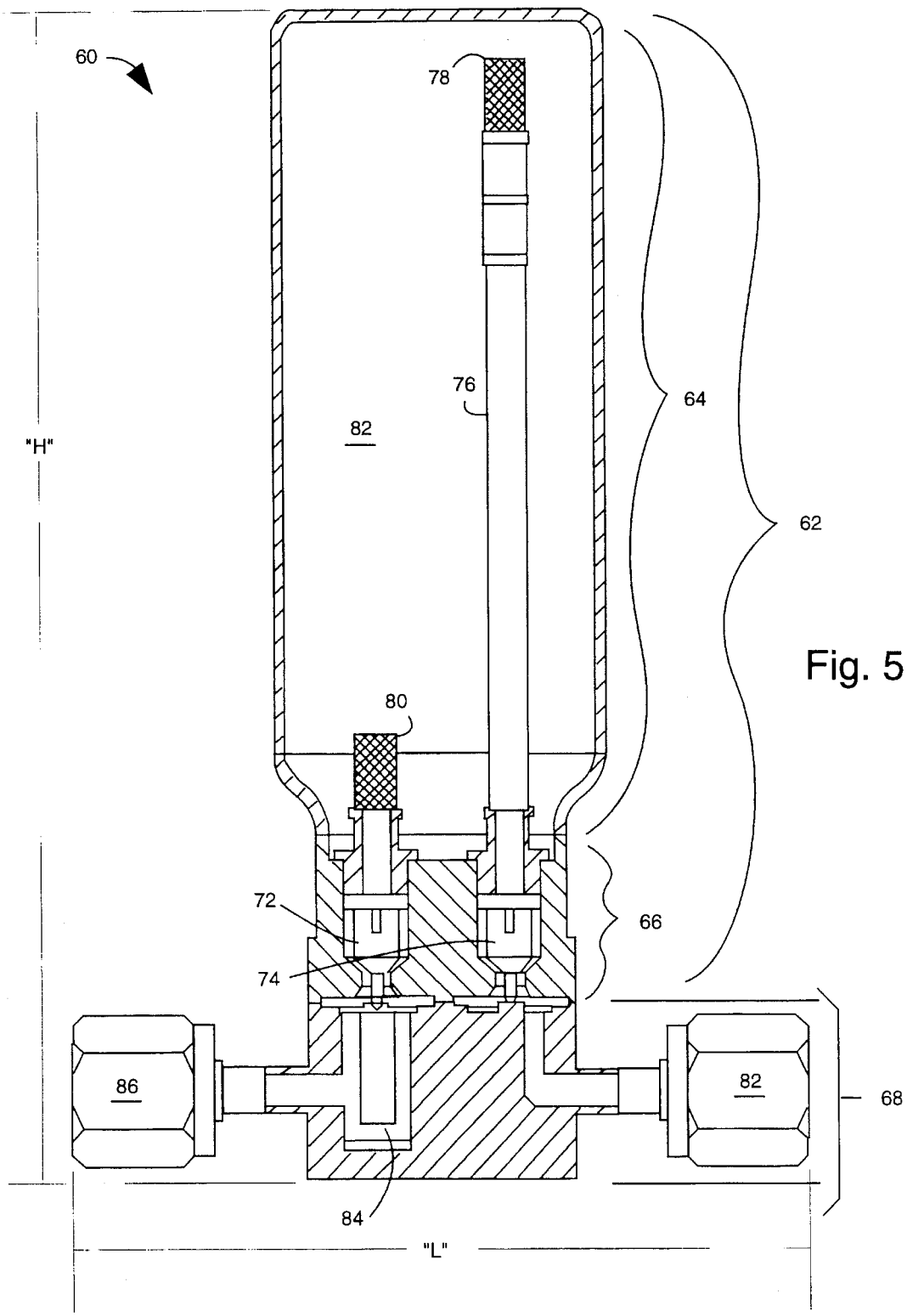
FIG. 5 is a cross-sectional view of the filter-purifier of FIG. 4 taken along the line 5—5.

FIGS. 4 and 5 illustrate another block filter-purifier embodiment of the present invention, referred to by the general reference numeral 60. The filter-purifier 60 is similar in many respects to the filter-purifier 10.

FIG. 5 shows that the block filter-purifier 60 comprises a canister assembly 62 that includes a cylinder 64 welded to a canister base 66 for attachment to an in-line block body 68, an exit valve 72 and an entrance valve 74. A tube 76 conducts entering gas through a screen mesh (frit) 78. Another screen mesh (frit) 80 allows gas to exit after passing through a purification medium 82, e.g., a resin, preferably NANOCHEM® as produced by Hercules, Inc., which forms a resin bed contained between the two screens 78 and 80. (Purifying mediums, such as NANOCHEM®, have the consistency of Styrofoam balls the size of grains of sand.) Typical gases that may be purified by the block filter-purifier 60 include those listed for filter-purifier 10. Therefore, an all stainless steel construction is preferred.

The valves 72 and 74 are preferably poppet-type valves that automatically close and seal medium 82 from contamination from the outside air whenever the canister assembly 62 is separated from the in-line block 68. Such poppet-valves are described in U.S. Pat. Nos. 4,971,110, and 5,139,747, which are incorporated herein by reference.

Gas flows through the block filter-purifier 60 by entering through a pipe fitting 82, through the valve 74 which is open, up the tube 76 through the screen 78. The medium 82 purifies the gas which exits through the screen 80, passed the valve 72 which is open, passed a filter 84, and out a pipe fitting 86. The pipe fittings 82 and 86 are preferably standard quarter-inch male fittings machined onto to block body 68 or female fittings welded onto block body 68. For example, Cajon Company "VCR®" type compatible fittings are used. Alternatively, tube ends may be welded on for special fittings or all-welded gas manifolds. Preferably, the block filter-purifier 60 has a gland-to-gland dimension "L" of 3.31 inches or five inches and a height dimension "H" not exceeding seven inches. Shorter dimensions "L" may be useful, but purification capacity may be impacted. The width of the block filter-purifier 60, which is perpendicular to the plane of FIG. 5, is preferably less than two inches. Such dimensions allow the block filter-purifier 60 to be used in a commercially-available mass flow controller (MFC).

As shown in FIG. 4, the canister assembly 62 attaches to the block body 68 with a set of four screws 88.

The canister assembly 10 (FIGS. 1–3) is such that the end cap 20 is a separate piece from the cylinder 14 to allow an initiation charge of the purification medium 32 within the canister assembly 12. The canister assembly 62 (FIGS. 4 and 5) is such that there is no end cap. Therefore, the valves 72 and 74 are machined to be screwed into the canister base 66. So before the valves 72 and 74 are installed in the canister base 66, an initiation charge of the purification medium 82 is placed within the cylinder 64.

Figure 6:
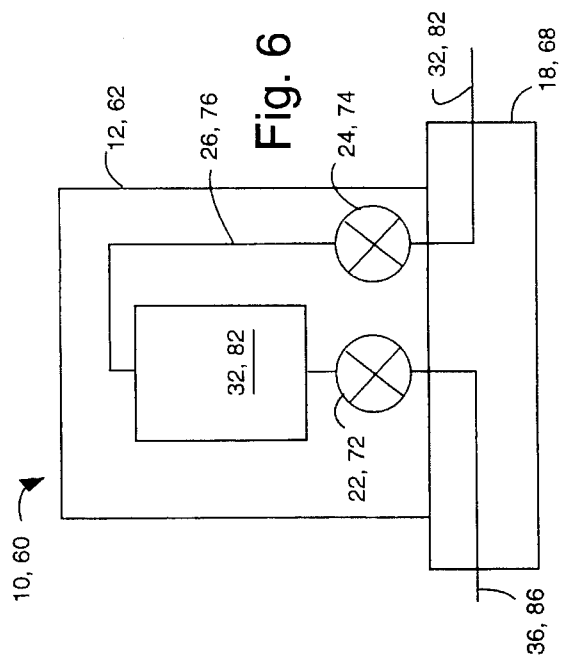
FIG. 6 is a schematic diagram of the filter-purifiers of FIGS. 1–5.

FIG. 6 is a schematic illustration of the filter-purifiers 10 and 60. It shows that the purification mediums 32 and 82 can be sealed-off from the atmosphere by valves 22, 24, 72 and 74, as is necessary when the canister assemblies 12 and 62 are separated from block bodies 18 and 68.

Figure 7:
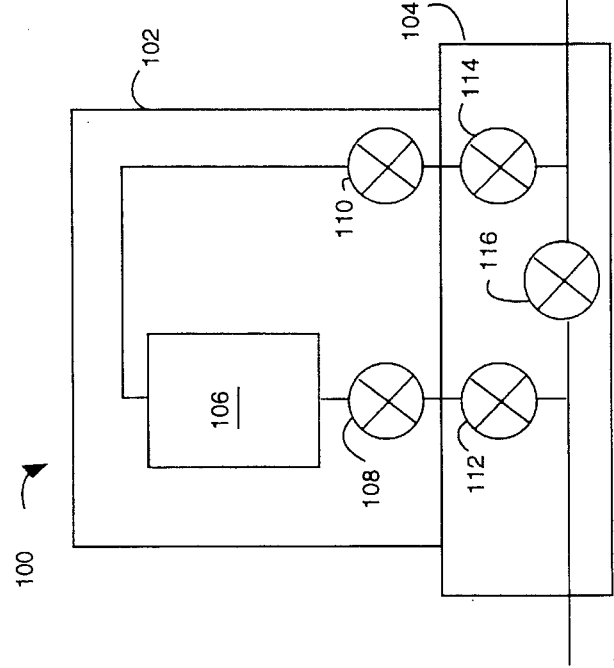
FIG. 7 is schematic diagram of a third embodiment of a filter-purifier of the present invention.

FIG. 7 illustrates a third embodiment of the present invention, which is a filter-purifier 100. The filter-purifier 100 comprises a canister 102, a block body 104, a purification medium 106, and a set of valves 108, 110, 112, 114 and 116. Preferably, valves 108, 110, 112 and 114 are poppet-type face seal valves that automatically close when the canister 102 is separated from the block body 104. Such a separation would occur routinely when the canister 102 was being exchanged for a fresh one, as is needed when the purification medium 106 of the old unit is loaded with contaminants. The automatic closing of the valves 112 and 114 is desirable in order to keep contaminants from entering the gas line in-line with the valves 112 and 114. The valve 116 is used for bypassing. Alternatively, the valves 112 and 114 are manually operable to close off the circuit to the canister 102 and/or operable to bypass a gas flow straight through, as is occasionally needed during a purging of a mass flow control unit.

Figure 8:
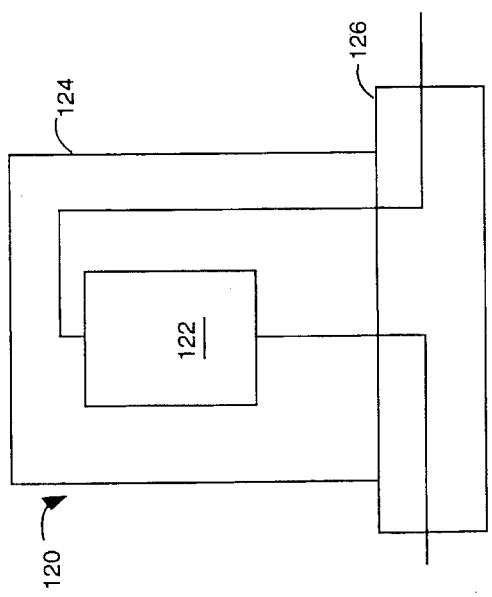
FIG. 8 is schematic diagram of a fourth embodiment of a filter-purifier of the present invention.

FIG. 8 illustrates a fourth embodiment of the present invention, which is a filter-purifier 120. The filter-purifier 120 includes a purification medium 122 within a canister 124. The filter-purifier 120 is used in applications where a platform 126 exists and where purification is needed with or without shut-off valves.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A point-of-use block-filter purifier, comprising:

a removable canister assembly (12) having a cylinder (14) secured to a canister base (16) with a first flat face that provides a gas circuit (22, 24, 26, 28, 30 and 32) between two separate adjacent areas of said first flat face;

a modular cubic mating block body (18) with a second flat face removably connected to said first flat face of said canister base (16) and having a gas inlet (32) and a gas outlet (36) on a pair of opposite third and fourth faces that are at right angles to said first and second flat faces and respectively connect into said two separate adjacent areas of said first flat face and said gas circuit (22, 24, 26, 28, 30 and 32);

a first automatic closing valve (24) mounted in said canister base (16) intermediate said gas inlet (32) and said cylinder (14) at one of said two adjacent areas of said first flat face and that provides for an interruption of said gas circuit (22, 24, 26, 28, 30 and 32);

a second automatic closing valve (22) mounted in said canister base (16) intermediate said gas outlet (36) and said cylinder (14) at another one of said two adjacent areas of said first flat face and that provides for an interruption of said gas circuit (22, 24, 26, 28, 30, and 32), wherein said first and second automatic valves (24, 22) provide for automatic closing when the removable canister assembly (12) is removed from the mating block body (18), and provide for automatic opening when the removable canister assembly (12) is attached to the mating block body (18);

a filter (34) positioned in the mating block body (18) intermediate the second automatic closing valve (22) and said gas outlet (36); and a sand-grain size granular gas purification material (32) in a resin bed disposed within said cylinder (14) providing for the removal of both particles and chemical impurities from process gases for the fabrication of semiconductor integrated circuits to flow and connected to be protected from atmospheric exposure through the first automatic closing valve (24) and the second automatic closing valve (22).

2. The filter-purifier of claim 1, wherein:

the first and second automatic closing valves (24, 22) each comprise a poppet with a stem and a face seal, a spring stack to press said face seal closed, and a collar to retain the spring, such that when the filter-purifier is not coupled to the surface of the mating component, the poppets will seal out atmospheric gases and prevent the destruction of the internal components by massive contamination.

3. The filter-purifier of claim 1, wherein:

said cylinder (14) includes an end cap (20) for providing access to the cylinder (14) for initial loading of said resin bed with the gas purification material (32).

4. The filter-purifier of claim 1, wherein:

the block body (18) mates to the canister assembly (12) such that the canister assembly (12) is to one side and orthogonal to a straight line path of gas flow between a gas inlet and a gas output connection in the block body (18), wherein a separation distance between said gas inlet and a gas output connections does not exceed all three outside dimensions of the canister.

5. The block filter-purifier of claim 1 further comprising, a screen (30) positioned within the canister assembly intermediate the gas purification material (32) and the second automatic closing valve (22).

6. The block filter-purifier of claim 1 wherein, said gas inlet (32) is in alignment with said gas outlet (36).

7. The block filter-purifier of claim 1 further comprising, a third automatic closing valve (114) positioned in the mating block (104) intermediate said gas input (32) and the first automatic closing valve (110); and a fourth automatic closing valve (112) positioned in the mating block (104) intermediate said gas output and the second automatic closing valve (108).

8. The block filter-purifier of claim 7 further comprising, a fifth closing valve (116) positioned in the mating block (104) within a channel interconnecting said gas inlet with said gas outlet (36).

9. The block filter-purifier of claim 8 wherein, said third, fourth and fifth closing valves (114, 112, 116) are in alignment.

* * * * *